No. 777,556. PATENTED DEC. 13, 1904.
A. A. SPADONE.
STAIR TREAD.
APPLICATION FILED DEC. 26, 1903.
NO MODEL.
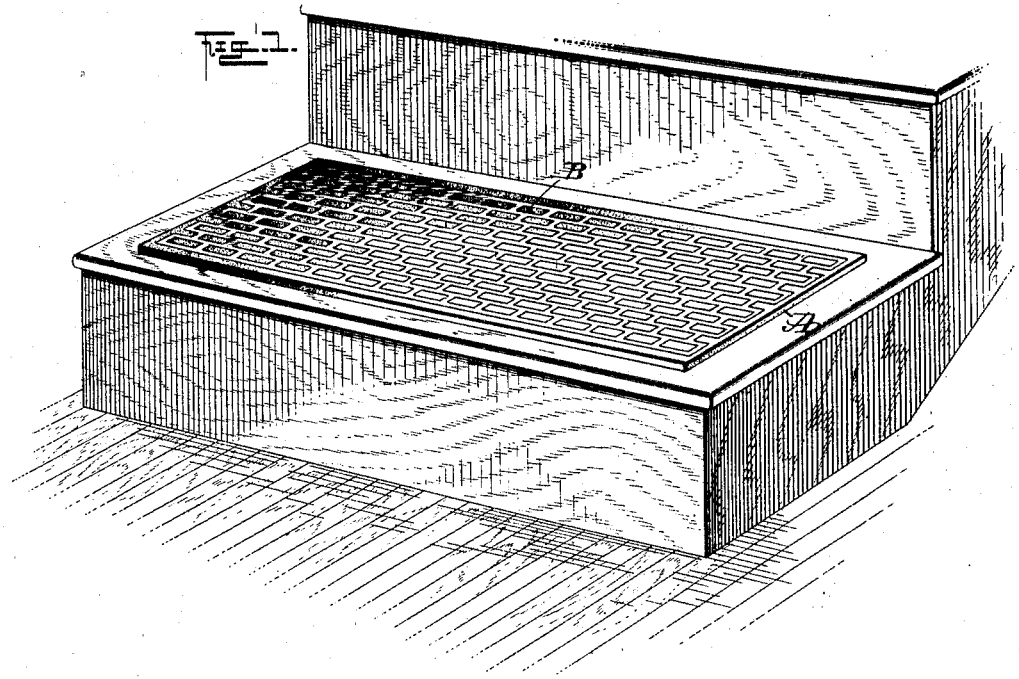
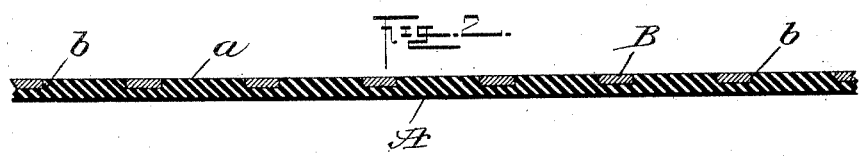
WITNESSES:
INVENTOR
Alfred A. Spadone
BY
ATTORNEYS No. 777,556. Patented December 13, 1904.

UNITED STATES PATENT OFFICE.

ALFRED A. SPADONE, OF NEW YORK, N. Y.

STAIR-TREAD.

SPECIFICATION forming part of Letters Patent No. 777,556, dated December 13, 1904.

Application filed December 26, 1903. Serial No. 186,607. (No model.)

*To all whom it may concern:*

Be it known that I, ALFRED A. SPADONE, a citizen of the United States, and a resident of the city of New York, borough of Manhattan, in the county and State of New York, have invented a new and Improved Stair-Tread, of which the following is a full, clear, and exact description.

My invention relates to improvements in stair-treads of that class which are designed to prevent the foot from slipping on the tread.

According to the present invention I combine layers of metal and rubber into a homogeneous structure, presenting a composite wear-surface that prevents the foot from slipping by reason of the exposure of the rubber and which is exceedingly durable in service by the incorporation of the metal with the rubber, the improved tread being cheap and rapid of manufacture and presenting a neat attractive wear-surface.

Further objects and advantages of the invention will appear in the course of the subjoined description, and the actual scope thereof will be defined by the annexed claims.

Reference is to be had to the accompanying drawings, forming a part of this specification, in which similar characters of reference indicate corresponding parts in both the figures.

Figure 1 is a perspective view of my improved stair-tread applied in operative position to a stair; and Fig. 2 is a detail longitudinal section, on an enlarged scale, through a portion of the stair-tread shown by Fig. 1.

My improved tread consists of a layer of vulcanized rubber A and a perforated metallic layer B, the latter being united permanently to and embedded in the rubber layer A to secure permanent interlocking engagement between the two layers and to present a tread-surface composed in part of the rubber and in part of the metal. The metal layer B is provided with a multiplicity of perforations or openings $b$, which may be of any desired shape and size, so as to produce a pattern on the exposed wear-surface of the composite tread. The layer B may be made from sheet metal of suitable thickness, and the holes or perforations may be cut or stamped therein by any suitable means; but, if desired, this metallic layer B may be of cast metal, and it may consist of an alloy of metals in order to minimize slipping of the foot on the tread.

In the manufacture of my improved tread I prepare a layer of compounded rubber of any suitable thickness, shape, and size. This rubber layer is placed within a suitable boundary or marginal frame, and on the rubber layer is laid the metallic perforated plate B of either cast or sheet metal. The marginal frame containing the compounded rubber layer and the metallic layer is now placed in a vulcanizing-press and the parts are subjected to heat and pressure, the same being applied for a proper length of time to secure vulcanization of the rubber. The initial application of heat to the compounded rubber softens the same to such an extent that the perforated metallic layer B will embed itself into the softened rubber under the application of pressure, and the rubber is thus pressed into the openings or perforations in the metallic plate in a way to produce a plurality of projections or keys $a$, which completely fill the openings of the plate. These keys or projections are flush with the exposed surface of the plate, so as to produce the desired composite wear-surface on the tread, and the keys or projections furthermore serve the important purpose of uniting the metallic and rubber layers permanently one to the other. After the rubber is properly vulcanized the tread and the marginal frame are removed from the press and the tread is lifted out of the frame, after which the tread may be finished in any suitable way known to those skilled in the art.

My improved tread is extremely simple in construction and capable of being manufactured at a low cost. The tread is durable and efficient in service and on exposure to the weather it is not affected thereby, nor does the rubber deteriorate under the action of the elements.

An essential feature of the invention is the permanent union effected between the rubber and metallic layers by the application of heat and pressure to the tread during the process of manufacturing the article.

Having thus described my invention, I claim as new and desire to secure by Letters Patent—

1. As a new article of manufacture, a composite stair-tread consisting of a rubber foundation and a perforated metallic plate, said plate being forcibly embedded in the foundation while the latter is uncured, and the rubber being then vulcanized and the parts united permanently by the adhesion of the rubber to the plate, the embedding of the plate in the rubber producing projections which will fill the openings in said plate and secure adhesion of the projections to the edges of the openings.

2. A composite stair-tread comprising a rubber foundation and a perforated metallic plate, said plate being forcibly embedded in the foundation while the rubber is uncured, and the rubber by vulcanization securing a permanent union with the embedded perforated plate.

In testimony whereof I have signed my name to this specification in the presence of two subscribing witnesses.

ALFRED A. SPADONE.

Witnesses:
G. H. BENNETT,
F. A. SULLIVAN.